Patented Nov. 10, 1925.

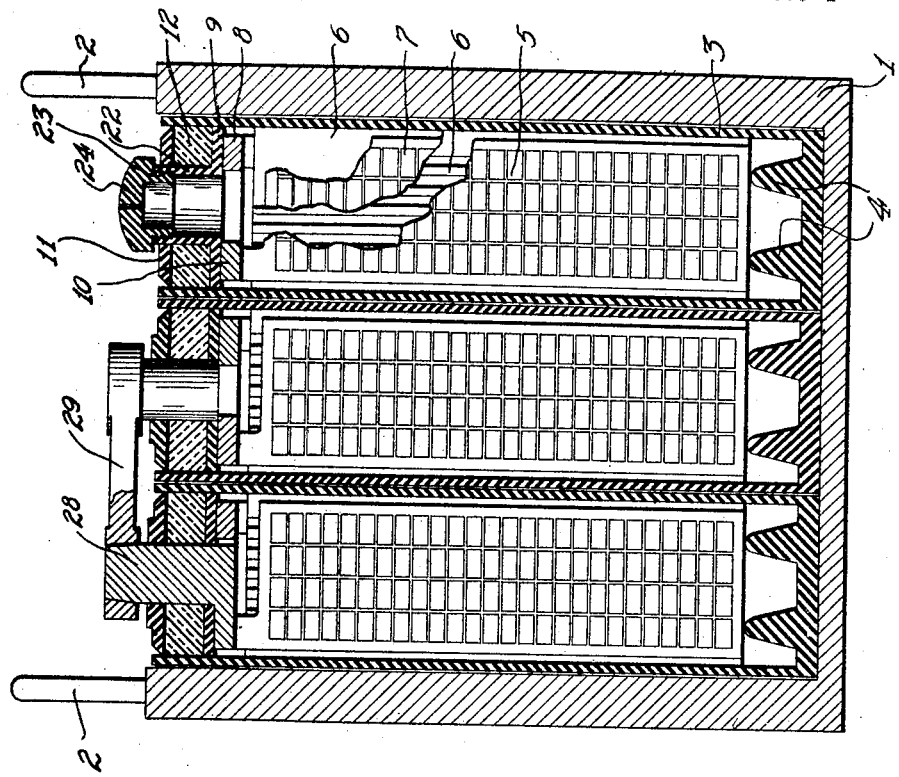

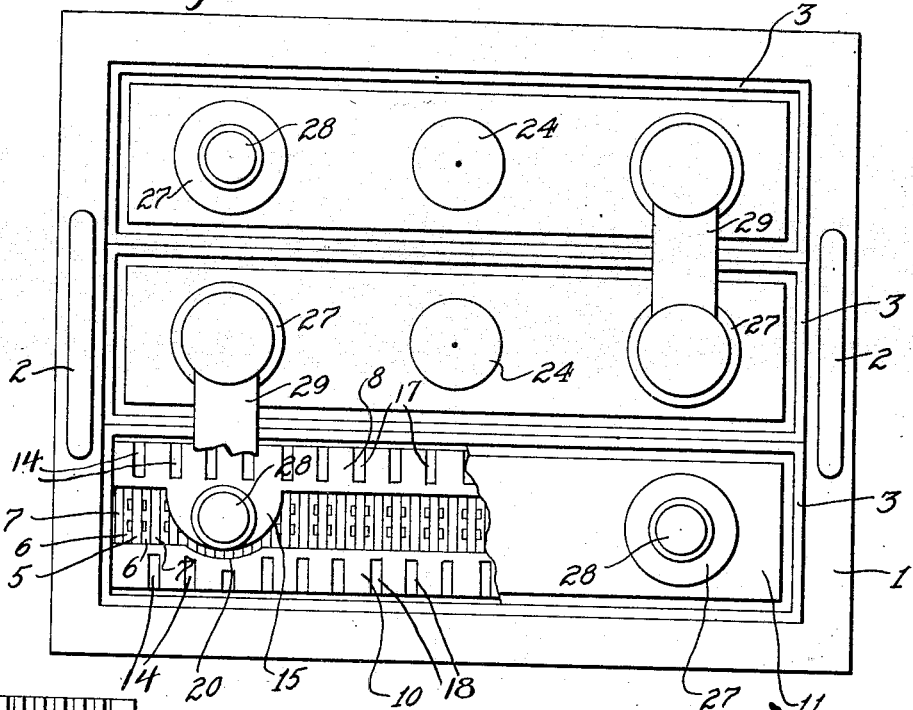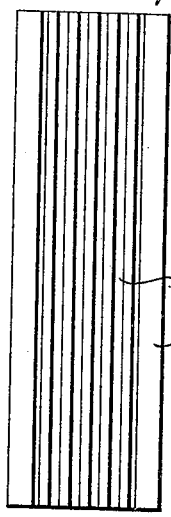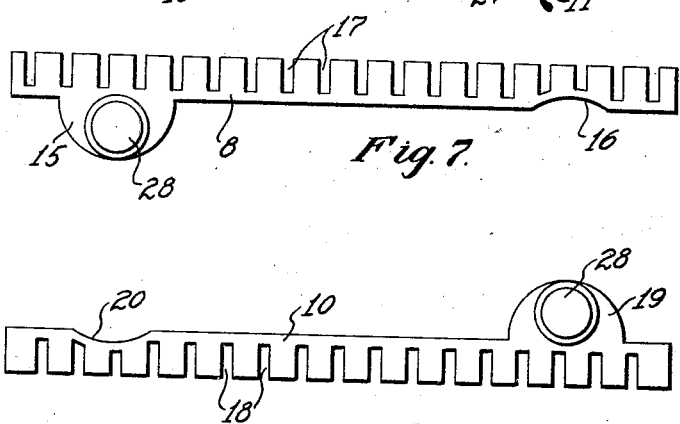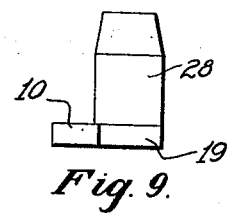

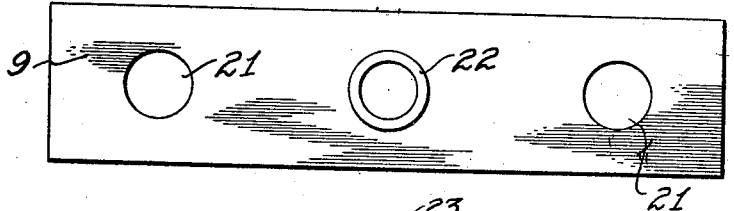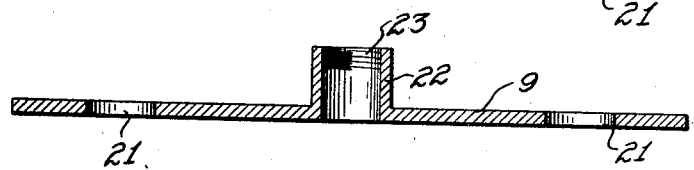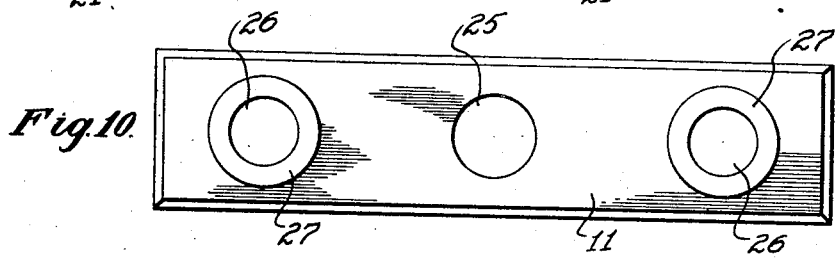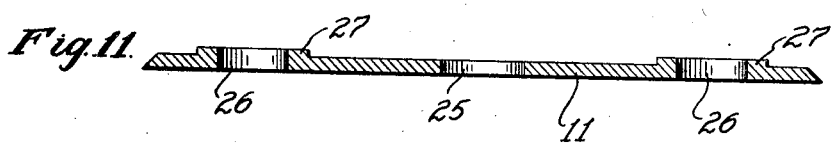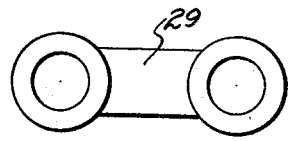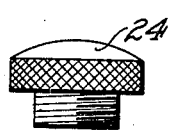

1,561,392

UNITED STATES PATENT OFFICE.

HOWARD L. YOUNG AND FREDERICK W. PLUMB, OF SHREVEPORT, LOUISIANA.

SECONDARY BATTERY.

Application filed April 11, 1921. Serial No. 460,548.

*To all whom it may concern:*

Be it known that we, HOWARD L. YOUNG and FREDERICK W. PLUMB, citizens of the United States, residing at Shreveport, in the parish of Caddo and State of Louisiana, respectively, have invented new and useful Improvements in Secondary Batteries, of which the following is a specification.

One object of our present invention is the provision of a storage battery in which the plates are so arranged that buckling and warping of the plates and the attendant piercing of separators between negative and positive plates and the formation of short circuits between said plates are precluded with the result that the usefulness of the battery is materially prolonged.

Another object is the provision of a storage battery of compact construction adapted to develop considerable power and withstand hard usage.

To the attainment of the foregoing, the invention consists in the improvement as hereinafter described and definitely claimed.

In the accompanying drawings, forming part hereof:—

Figure 1 is a vertical section of a storage battery constructed in accordance with our invention.

Figure 2 is a top plan of the same with the cover of one cell partially removed.

Figure 3 is an elevation of one of the negative plates.

Figure 4 is an elevation of one of the positive plates.

Figures 5 and 6 are views of one of the wood separators.

Figure 1 is a view of one negative strap.

Figure 8 is a view of one positive strap.

Figure 9 is a detail elevation showing one positive strap and its post.

Figures 10 and 11 are detail views of one uppermost cover.

Figures 12 and 13 are views of one lower cover.

Figures 14 and 15 are detail views of one cell connector.

Figure 16 is a detail elevation of one vent plug.

Similar numerals of reference designate corresponding parts in all of the views of the drawings.

Our novel battery is designed to be carried in a casing 1 of wood or any other material compatible with its purpose. The said casing 1 is preferably equipped at 2 with handles.

In the illustrated embodiment of our invention we arrange three cells in the said casing 1. The said cells are identical in construction and therefore a detailed description of one cell will suffice to impart a definite understanding of the three. Each cell includes a jar 3 of rubber or other appropriate material, open at its top and provided on its bottom with ribs 4. In each jar 3 are arranged positive plates 5, separators 6 of wood or other appropriate material, negative plates 7, a negative strap 8, a lower cover 9, a positive strap 10, an uppermost cover 11 and sealing compound indicated by 12. The positive plates 5 are shaped and constructed as best shown in Figure 4. The wooden separators are grooved longitudinally as indicated by 13 in Figures 5 and 6 and are of rectangular form. The negative plates 7 are shaped and constructed similarly to the positive plates 5, and in this connection it will be understood that each of the said plates is provided at its upper end with a projection 14. As best shown in Figure 7 the negative strap 8 is provided at 15 with a lateral offset, and at 16 with a recess, and is kerfed at intervals in its length as indicated by 17. The positive strap 10, best shown in Figure 8 is kerfed at 18 and is provided with a lateral offset 19 and a recess 20. The lower cover 9 is preferably of rubber and is apertured at 21 and is provided with an upstanding sleeve 22 interiorly threaded at 23 for the reception of the vent plug 24. The uppermost cover 11 is centrally apertured at 25 and is provided at 26 with apertures surrounded by upstanding flanges 27. It will also be understood that each cell is equipped with upstanding posts 28 on the lateral offsets of the straps 8 and 10 and that the posts of the cells are connected through the medium of the connectors 29. The projections 14 of the negative plates 7 are disposed and held in the kerfs 17 of the negative strap 8, and the projections 14 of the positive plates 5 are received and held in the kerfs 18 of the positive strap 10, Figures 1 and 2.

It will be apparent from the foregoing that in our novel battery the causes of buckling and warping of the plates are eliminated, and in this connection it will be appreciated that all the plates are assembled and closely fitted in a jar with the result that all side pressure is eliminated; the only pressure present being at the ends of the elements, and the said ends being protected by the casing and closure.

Having described our invention, what we claim and desire to secure by Letters-Patent, is:—

A battery cell comprising a jar, positive and negative plates snugly fitted in said jar and each having a projection at its upper end and at its outer vertical edge, nonconducting means interposing between the positive and negative plates, positive and negative straps arranged above the major portions of the plates and having kerfs in their outer edges receiving the said projections of the plates; each of said straps also having on its inner edge near one of its ends a lateral offset bearing an upstanding post and also having in its inner edge near its opposite end a recess opposite the lateral projection of the other strap, a lower cover superimposed on the said straps and receiving said posts, an upper cover receiving the said posts and spaced above the lower cover, and sealing material interposed between the said covers and also between the walls of the jar.

In testimony whereof we affix our signatures.

HOWARD L. YOUNG.
FREDERICK W. PLUMB.